Dec. 19, 1922.

A. DE CONINCK.

SELF LUBRICATING PIVOT JOINT WITH REGULATION OF THE LATERAL PLAY.

FILED MAR. 21, 1921.

Patented Dec. 19, 1922.

1,439,297

UNITED STATES PATENT OFFICE.

ARTHUR DE CONINCK, OF BRUSSELS, BELGIUM.

SELF-LUBRICATING PIVOT JOINT WITH REGULATION OF THE LATERAL PLAY.

Application filed March 21, 1921. Serial No. 454,082.

*To all whom it may concern:*

Be it known that I, ARTHUR DE CONINCK, a subject of the King of Belgium, a resident of Brussels, Belgium, have invented new and useful Improvements in Self-Lubricating Pivot Joints with Regulation of the Lateral Play, of which the following is a specification.

In mechanical construction, and in particular in automobile construction, it is highly desirable that the numerous pivot joints be always adjusted with precision and well lubricated in order to avoid rapid wear of the parts of the joint, and the disagreeable play and noise which result therefrom.

In particular the lateral play gives rise to a very disagreeable chattering noise which is manifested by a harassing of the abutting surfaces and a still more rapid wear of these surfaces, even when in general, some means is provided to compensate for this wear.

With a view to retard the production of a similar lateral play, one is quite naturally led to a rigorous initial adjustment of the abutting ends, but such an adjustment nearly always makes the assemblage of the parts to be jointed very inconvenient and difficult.

The object of the present invention is to provide a jointing device which can permit of an immediate regulation of the lateral play and of ensuring all the ease desirable for the assemblage of the parts of the joint, while providing at the same time a rational lubrication for the rubbing surfaces.

Such a device is applicable more particularly to the shackles of suspension springs, connecting rods or other thrusting parts which serve to transmit the force of propulsion of the driving axle to the frame of the vehicle, etc.

As a simple demonstrative example, the annexed drawing represents a constructional form of a joint constructed according to the invention.

In the example selected, the joint in question is the joint between the end of a thrust connecting rod 4 and a forked piece 5 fixed to the cross bar 6 of a chassis frame 7 of an automobile the partial whole of which is represented by the plan view Figure 1.

Figure 2 is a horizontal section of the joint.

Figure 3 is a side elevation of this joint.

The arms 8 and 9 of the forked piece 5 receive the thrust each having an eye lined with a removable bush 10 with a collar 11. The end of the thrust connecting rod 4 has a cylindrical hole or eye lined with two opposite half bushes 12, with a collar 13 and leaving a small space 14 between them.

The end of the connecting rod lined with its two half bushes 12 is made of such dimensions as to allow of very free play of the said rod between the arms 8 and 9.

A tubular pivot 15 passing into the bushes constitutes the jointing device.

The bush of the arm 8 may be moved axially by an amount which is adjustable at will, in the eye of this arm.

To this end, the end 16 opposite the collar 11 projects externally of the arm and is screw threaded externally to receive a nut 17.

The whole is completed by a bolt 18 with washers 19 and 20, the washer 19 bearing against the arm 9 while the washer 20 bears against the projecting end of the bush lining the arm 8.

In the example shown, the end of the thrust connecting rod is provided with a reservoir for lubricant indicated at 21 with a supply passage 22 opening into the empty space between the two half bushes 12. Diagonal grooves 23, 24 provided in the interior surface of the bushes 10 and 12 distribute the lubricant and supply it to the grooves 25 cut between the abutment collars 11 and 13.

This arrangement of diagonal grooves permits of the automatic lubrication of the whole of the rubbing surfaces including the surfaces of the abutment collars 11 and 13.

With the above described arrangement, the end of connecting rod 4 can be easily introduced between the arms of the forked piece 5. Moreover, after the pivot and the bolt have been put in place, the lateral play left intentionally for the easy introduction of the head of the connecting rod 5 in the forked piece can be immediately taken up or done away with.

To this end it suffices to unscrew the nut 17 by an amount corresponding to this play and then to tighten up the nut 26 the effect of which is to push the washer 20 and the corresponding bush 10 in such a way that the collars 11 and 13 are brought into contact.

The tightening up of the nut 26 has the effect of locking the nut 17 on the screw thread of its bush.

To dismount the connecting rod, for example, for the purpose of replacing the bushes of the tubular pivot, it suffices to unscrew the nut 26 and then screw up the nut 17, until the collar 11 is brought into contact with the arm 8.

Sufficient play is thus reestablished to permit the easy dismounting and replacement of the connecting rod 4.

It should be noted in considering Figure 1, that the thrust on the cross piece 6 of the chassis 7 is exerted by means of two connecting rods 4 which are integral with the thrust member 27 attached to the driving axle 28.

The ends of these two connecting rods 4 must therefore be capable of being introduced simultaneously into the two forked pieces fixed to the cross piece.

An entry with very free play between the arms of each forked piece 5 is indispensable in order to permit of the easy introduction simultaneously of the two ends of the connecting rods 4 into the forked pieces.

An arrangement which permits of the immediate take up of this initial lateral play and of compensating afterwards the wear of the collars 11 and 13 in proportion as it is produced is likewise indispensable.

The example of a thrust member with two arms 4—4 has been specially chosen in order to show better the advantages of the joint with adjustable lateral play which forms the subject matter of this invention.

Instead of providing a reservoir for lubricant 21 in one of the parts to be jointed, as shown in Figures 2 and 3, I may employ a bolt reservoir 18 which will become thus a lubricating bolt of any one of the well known types.

This modification is not shown in the drawing but it will be immediately understood by those skilled in the art without further description.

It is obvious that the invention applies equally to vertical pivot joints especially in the case of the joint of the head of a front axle with the barrel of the hub of the corresponding front wheel.

In this case the adjusting device is utilized for the vertical play in height.

What I claim is:

1. A joint comprising a member having a pair of spaced arms each provided with an eye, a second member having an eye arranged between those of the spaced arms, bushings in the said eyes and having collars at their opposing ends between said eyes, a tubular pivot extending through and fitting in the eyes, closures on the ends of the tubular pivot and bearing against the outer ends of the bushings in the eyes of the said arms, a pivot bolt extending through the tubular pivot and closures, and clamping means on said bolt, bearing against the closures and active to take up lateral play and compensate for wear of the collars.

2. A joint comprising a member having a pair of spaced arms each provided with an eye, a second member having an eye arranged between those of the spaced arms, bushings in the said eyes and having collars at their opposing ends between said eyes, a tubular pivot extending through and fitting in the eyes, closures on the ends of the tubular pivot and bearing against the outer ends of the bushings in the eyes of the said arms, a pivot bolt extending through the tubular pivot and closures, and clamping means on said bolt, bearing against the closures and active to take up lateral play and compensate for wear of the collars, said collars having lubricant receiving chambers in their opposing sides and said bushings having lubricant distributing ducts in their interior surfaces.

3. A joint comprising a member having a pair of spaced arms each provided with an eye, a second member having an eye arranged between those of the spaced arms, bushings in the said eyes and having collars at their opposing ends between said eyes, a tubular pivot extending through and fitting in the eyes, closures on the ends of the tubular pivot and bearing against the outer ends of the bushings in the eyes of the said arms, a pivot bolt extending through the tubular pivot and closures, and clamping means on said bolt, bearing against the closures and active to take up lateral play and compensate for wear of the collars, said collars having lubricant receiving chambers in their opposing sides and said bushings having lubricant distributing ducts in their interior surfaces, the bushings in the eye of said second named member and the said second named member also having lubricant distributing ducts communicating with the first named ducts.

In testimony whereof I affix my signature in presence of two witnesses.

ARTHUR DE CONINCK.

Witnesses:
F. R. MEEK,
T. BALAND.